United States Patent
Adaniya et al.

(10) Patent No.: US 8,659,200 B2
(45) Date of Patent: Feb. 25, 2014

(54) PERMANENT MAGNET EMBEDDED ROTATING ELECTRICAL MACHINE

(75) Inventors: Taku Adaniya, Kariya (JP); Minoru Mera, Kariya (JP); Hiroshi Fukasaku, Kariya (JP)

(73) Assignee: Kabushiki Kaisha Toyota Jidoshokki, Kariya-Shi (JP)

( * ) Notice: Subject to any disclaimer, the term of this patent is extended or adjusted under 35 U.S.C. 154(b) by 699 days.

(21) Appl. No.: 12/881,423

(22) Filed: Sep. 14, 2010

(65) Prior Publication Data

US 2011/0062814 A1    Mar. 17, 2011

(30) Foreign Application Priority Data

Sep. 14, 2009 (JP) ................................. 2009-212352

(51) Int. Cl.
*H02K 21/12* (2006.01)
(52) U.S. Cl.
USPC ................................. 310/156.57; 310/156.46
(58) Field of Classification Search
USPC .................. 310/156, 156.46, 156.53, 156.56, 310/156.57
See application file for complete search history.

(56) References Cited

U.S. PATENT DOCUMENTS

| 7,667,363 B2 * | 2/2010 | Adaniya et al. | 310/156.53 |
| 2005/0200223 A1 * | 9/2005 | Tajima et al. | 310/156.46 |
| 2007/0126305 A1 * | 6/2007 | Okuma et al. | 310/156.53 |
| 2010/0166575 A1 * | 7/2010 | Fukuda et al. | 417/410.1 |

FOREIGN PATENT DOCUMENTS

| JP | 2001-178047 A | 6/2001 |
| JP | 2005-124281 A | 5/2005 |
| JP | 2005-261024 A | 9/2005 |
| JP | 2007-159197 A | 6/2007 |
| JP | 2007-236096 A | 9/2007 |
| JP | 2007-300692 A | 11/2007 |

* cited by examiner

*Primary Examiner* — Dang Le
(74) *Attorney, Agent, or Firm* — Yoshida & Associates, LLC

(57) ABSTRACT

The permanent magnet embedded rotating electrical machine includes a rotor and a plurality of flat permanent magnets. The rotor has on an outer periphery thereof a plurality of pairs of concave portions and a plurality of convex portions. Each of the convex portions is located between the pair of concave portions. The concave portions are formed at radially outward of respective adjacent magnetic pole ends of the permanent magnet. A bridge is provided in the rotor at an angular position about an axis of the rotor between opposed magnetic pole ends of two adjacent permanent magnets. Each concave portion at radially outward of the magnetic pole end of the permanent magnet is located close to the center of the same permanent magnet in relation to the bridge next to the permanent magnet in the circumferential direction of the rotor.

6 Claims, 10 Drawing Sheets

PERMANENT MAGNET EMBEDDED ROTATING ELECTRICAL MACHINE

BACKGROUND OF THE INVENTION

The present invention relates to a permanent magnet embedded rotating electrical machine which includes a stator having coils, a rotor rotatably located inside the stator and a plurality of flat permanent magnets embedded in the rotor as magnetic poles.

In this type of rotating electrical machine, a plurality of permanent magnets are embedded in the rotor of in the circumferential direction thereof in such a way that two adjacent magnetic poles of any two adjacent permanent magnets are different. Rapid change in magnetic flux density occurs between the two adjacent permanent magnets, that is, at a magnetic pole switching position. As a result, torque pulsation occurs, which causes vibration and noise in the rotating electric machine. Such torque pulsation will be referred to as torque ripple hereinafter. The torque ripple represents fluctuation range of output torque of the rotating electric machine.

Japanese Patent Application Publication No. 2005-261024 discloses a permanent magnet rotating electrical machine whose rotor core includes a pole piece located in an air gap surface of a permanent magnet and forming a magnetic path of the permanent magnet, an auxiliary magnetic pole that projects to the air gap surface at a position between any two adjacent permanent magnets of a plurality of permanent magnets for generating reluctance torque, a rotor yoke located in an anti-air gap surface of the permanent magnet and forming a magnetic path between the auxiliary magnetic pole and the permanent magnet, and a recess formed in the air gap surface of the pole piece and smoothly receding from the magnetic pole center toward the magnetic pole end. In order to suppress the torque ripple, the recesses formed on the opposite sides of the magnetic pole center are located in the range of electrical degree of 20° to 30° as measured from the magnetic pole center when the number of slots per pole and per phase of the stator is two. The recesses formed on the opposite sides of the magnetic pole center are located in the range of electrical degree of 15° to 45° as measured from the magnetic pole center when the number of slots per pole and per phase of the stator is one.

The range of electrical degree of the rotating electrical machine disclosed by Japanese Patent Application Publication No 2005-261024 is desirable in the case of the rotor where the permanent magnets are arranged in the shape of V (or where the permanent magnets are not arranged in rotational symmetry). However, such range of electrical degree cannot be applied to the rotor where flat permanent magnets are arranged in a block form (or where the permanent magnets are arranged in rotational symmetry).

The present invention is directed to a permanent magnet embedded rotating electrical machine having a plurality of flat permanent magnets having rotational symmetry and capable of suppressing torque ripple.

SUMMARY OF THE INVENTION

In accordance with an aspect of the present invention, the permanent magnet embedded rotating electrical machine includes an annular stator, a rotor and a plurality of flat permanent magnets. The annular stator has on an inner circumference thereof teeth to define a plurality of slots between the teeth. The slots have therein coils. The rotor is located inside the stator. The rotor is rotatable on an axis. The rotor has on an outer periphery thereof a plurality of pairs of concave portions and a plurality of convex portions. Each of the convex portions is located between the pair of concave portions. Outer surfaces of the convex portions are formed at radially outward of deepest portions of the concave portions. The pair of concave portions is spaced apart from other pair of concave portions in circumferential direction of the rotor. The permanent magnets are embedded in the rotor in rotational symmetry in a manner that each permanent magnet is spaced apart from the other. Opposed magnetic pole ends of two adjacent permanent magnets are formed at radially inward of the respective concave portions. Each permanent magnet has a magnetic pole center between the magnetic pole ends. A bridge is provided in the rotor at an angular position about the axis between the opposed magnetic pole ends of two adjacent permanent magnets. Each concave portion at radially outward of the magnetic pole end of the permanent magnet is located close to the magnetic pole center of the same permanent magnet in relation to the bridge next to the permanent magnet in the circumferential direction of the rotor.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE PREFERRED EMBODIMENTS

Figure 1:
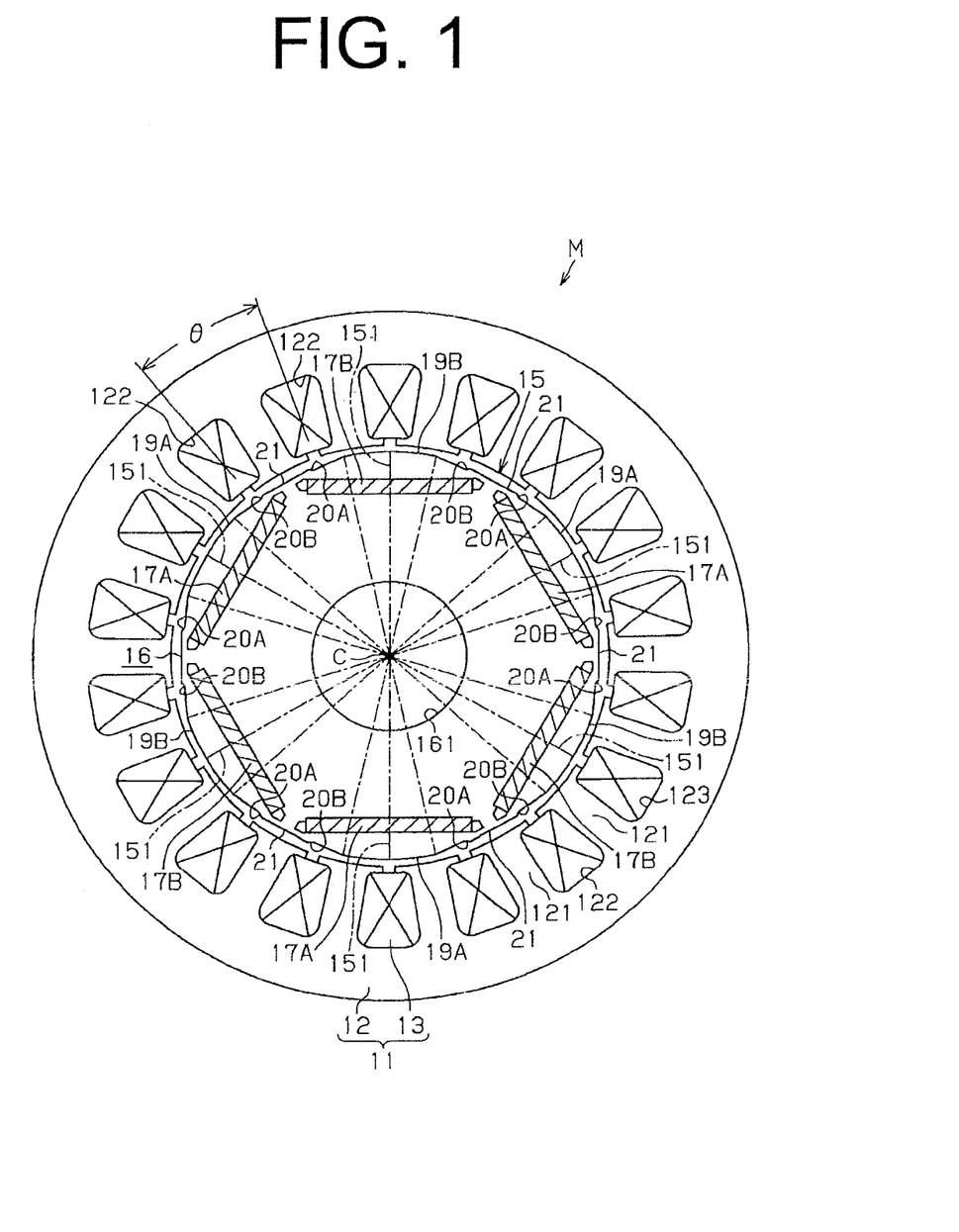
FIG. 1 is a cross sectional view showing a stator and a rotor of a permanent magnet embedded rotating electrical machine according to a preferred embodiment of the present invention.

The following will describe the permanent magnet embedded rotating electrical machine according to the preferred embodiment of the present invention with reference to FIGS. 1 through 11C. Referring to FIG. 1 showing a permanent magnet embedded rotating electrical machine M, it includes an annular stator 11 and a rotor 15 located inside the stator 11. The stator 11 has an annular stator core 12 and coils 13. The stator core 12 has on the inner circumference thereof a plurality of teeth 121 and a plurality of slots 122 each formed between any two adjacent teeth 121. In the present embodiment, as many as eighteen teeth 121 and slots 122 are formed. The slots 122 are arranged substantially at an equal interval in the circumferential direction of the stator core 12.

Figure 4:
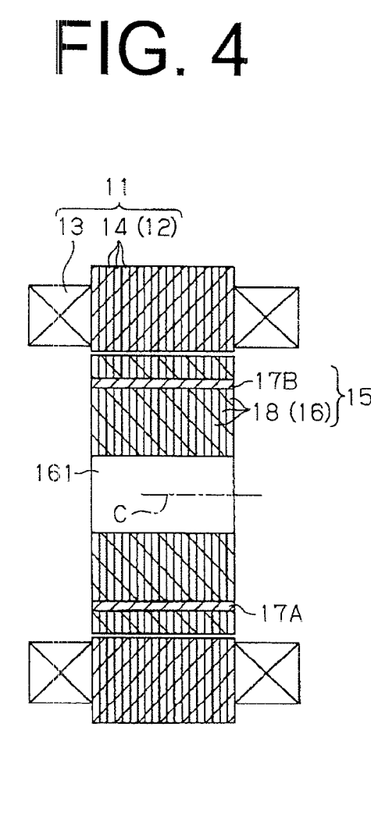
FIG. 4 is a side cross-sectional view showing the stator and the rotor of FIG. 1.

As shown in FIG. 4, the stator core 12 is made of a plurality of core sheets 14 laminated together. Each core sheet 14 is made of a magnetic material such as steel sheet.

In general, the number of slots K of a stator can be expressed as, $$K = q \cdot p \cdot m$$

wherein p (integer) represents the number of poles, m (integer) the number of phases, and q the number of slots per pole per phase. The number of slots q takes values with an increment of 0.5, such as q=0.5, 1.0, 1.5, 2.0, 2.5 and so forth.

For example, when m=3 and q=1, K=12 and p=4, K=18 and p=6, K=24 and p=8, or the like. Further, when m=3 and q=1.5, K=18 and p=4, K=27 and p=6, K=36 and p=8, or the like. In the present embodiment, m=3, K=18, p=6 and q=1.

Figure 5:
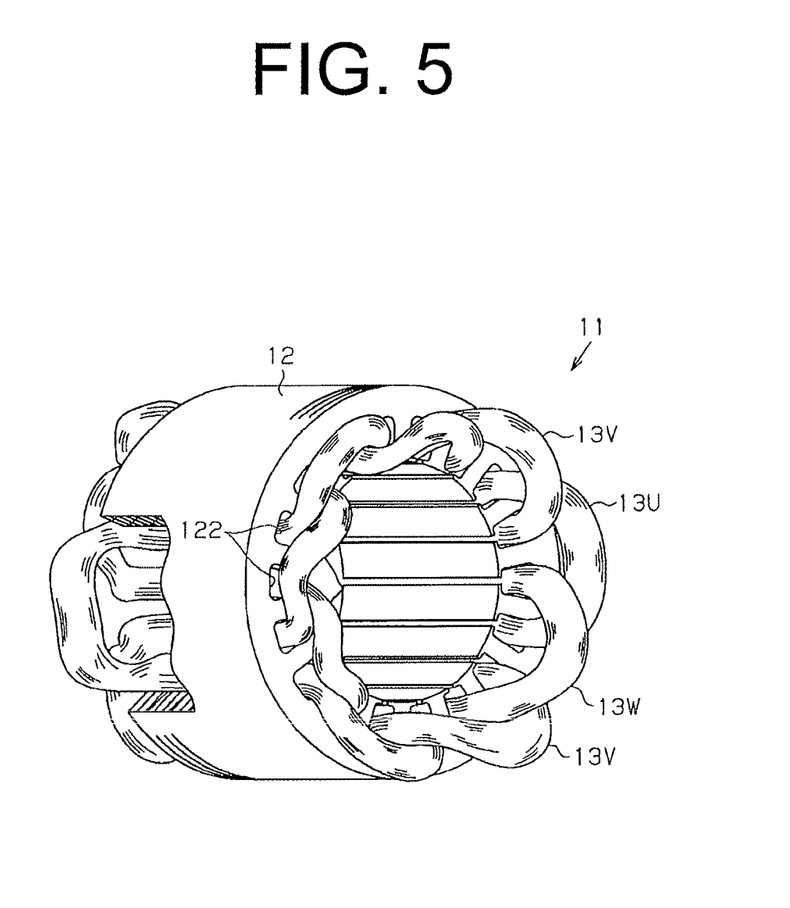
FIG. 5 is a perspective view showing the stator of FIG. 1.
Figure 6:
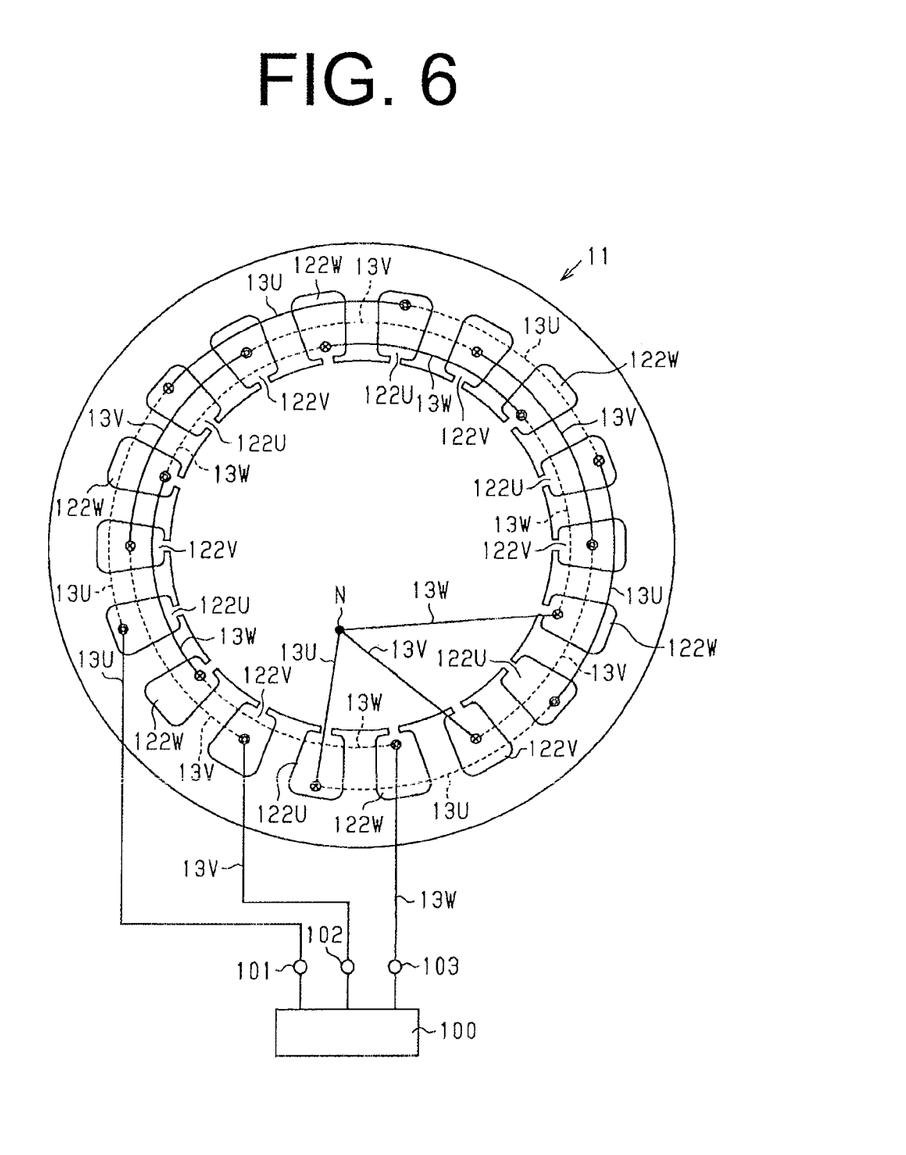
FIG. 6 is a simplified schematic view explaining wave winding of the coil in the stator of FIG. 1.

As shown in FIGS. 5 and 6, the coils 13 are formed by winding conductive wires in the slots 122 in the manner of wave winding. The coils 13 have a U-phase coil 13U, a V-phase coil 13V and a W-phase coil 13W. The U-phase coil 13U having one end thereof connected to a terminal 101 of the inverter 100 is inserted in a group of first slots 122U. In a similar manner, the V-phase coil 13V having one end thereof connected to a terminal 102 of the inverter 100 is inserted in a group of second slots 122V and the W-phase coil 13W having one end thereof connected to a terminal 103 of the inverter 100 is inserted in a group of third slots 122W. Solid lines of the coils 13U, 13V, 13W indicate that they are provided on the viewer's side of the stator 11 in the drawing of FIG. 6. Broken lines of the coils 13U, 13V, 13W indicate that they are provided on the opposite side of the stator 11. The connections between the solid lines and the broken lines of the coils 13U, 13V, 13W are inserted in the slots 122U, 122V, 122W, respectively. The other ends of the coils 13U, 13V, 13W are connected together to provide a neutral point N of the permanent magnet embedded rotating electrical machine M.

Referring back to FIG. 1, the rotor 15 has a rotor core 16, a plurality of first flat permanent magnets 17A and a plurality of second flat permanent magnets 17B. The first and second permanent magnets 17A and 17B are arranged alternately and all embedded in the rotor core 16. As shown in FIG. 1, in the present embodiment, there is provided a total of six permanent magnets, including three first permanent magnets 17A and three second permanent magnets 17B. The permanent magnets 17A and 17B have substantially the same shape and size and have rotational symmetry with respect to the axis of rotation C of the rotor 15 (refer to FIG. 4).

The eighteen slots 122 are arranged substantially at an equiangular interval in the circumferential direction of the stator 11. The angular interval or angular width θ of the slots 122 is 20°. The angular width has its center at the axis of rotation C of the rotor 15.

As shown in FIG. 4, the rotor core 16 is made of a plurality of core sheets 18 laminated together. Each core sheet 18 is made of a magnetic material such as steel sheet. The rotor core 16 has at the center thereof a shaft hole 161 through which an output shaft (not shown) extends and fixed. The rotor 15 is rotatable in arrow direction Y as shown in FIG. 2.

Figure 2:
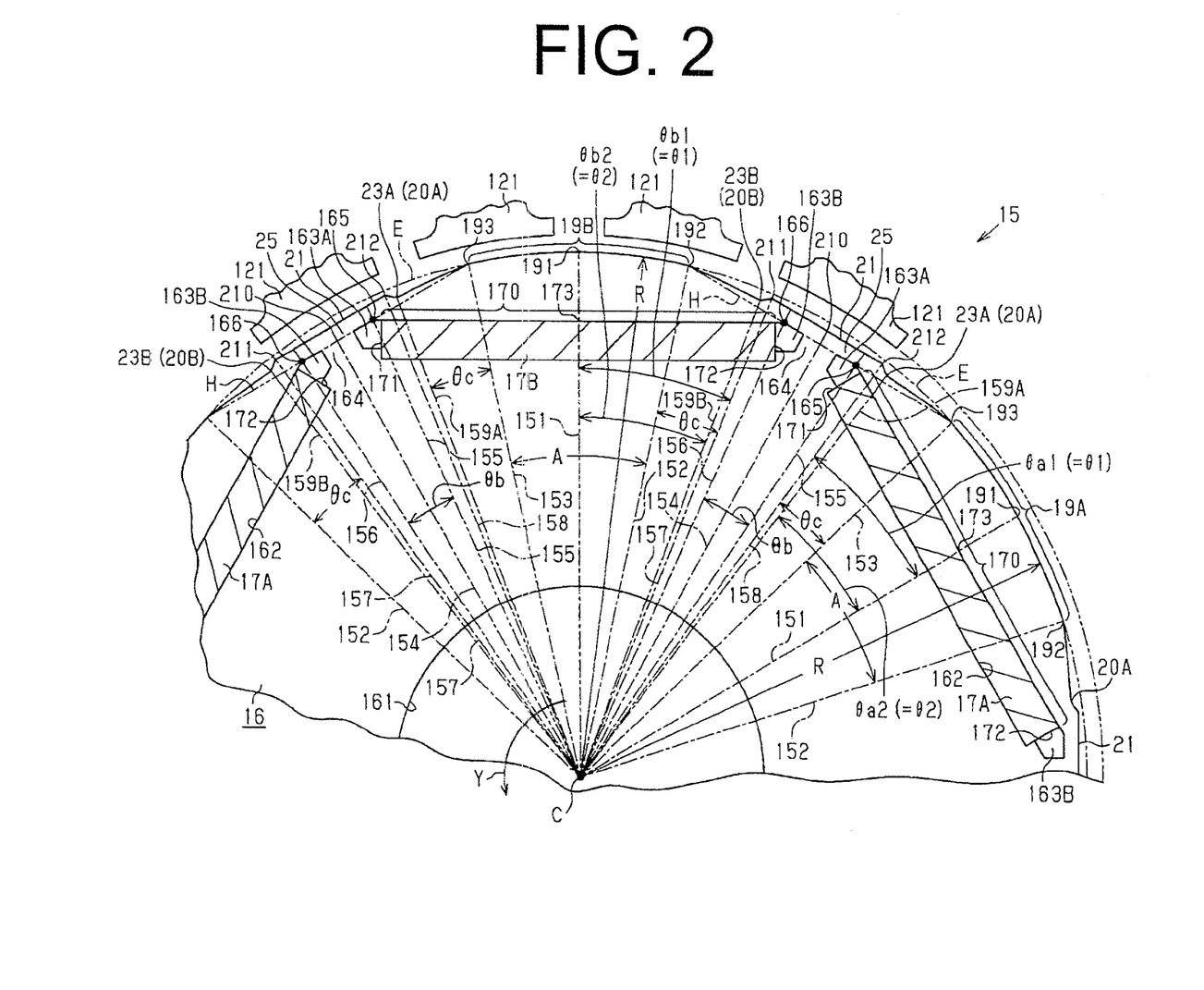
FIG. 2 is a partially enlarged view showing the rotor of the permanent magnet embedded rotating electrical machine of FIG. 1.

As shown in FIG. 2, the rotor core 16 has therethrough six receiving holes 162 (only three being shown), in which the first permanent magnets 17A and the second permanent magnets 17B are fitted. The receiving holes 162 extend parallel to the shaft hole 161. The first and second permanent magnets 17A and 17B are arranged such that any two adjacent magnetic poles of any two adjacent permanent magnets 17A and 17B have different polarities. That is, the first and second permanent magnets 17A and 17B are embedded in the rotor core 16 so as to have alternatively different polarities in the circumferential direction of the rotor 15.

In FIG. 2, reference numerals 171, 172 designate the opposite ends, 173 the center, and 170 the pole face of each permanent magnet 17A, 17B. Reference numeral 151 designates a line of radius passing through the center 173 in perpendicular relation to the magnetic pole face 170 of each permanent magnet 17A, 17B in an imaginary plane extending perpendicularly to the axis C of the rotor 15. The lines of radius 151 extend from the axis C and are located substantially at an equiangular interval (60°) with respect to the axis C. The permanent magnets 17A and 17B are spaced from the axis C of the rotor 15 substantially at the same distance and arranged substantially at the same interval in the circumferential direction of the rotor 15.

As shown in FIG. 2, each receiving hole 162 has at the opposite ends thereof a first air gap 163A and a second air gap 163B that are adjacent to the magnetic pole ends 171 and 172 of the permanent magnets 17A and 17B, respectively. With the permanent magnets 17A and 17B fitted in the receiving holes 162, the first air gap 163A and the second air gap 163B are formed at the opposite ends of each of the permanent magnets 17A and 17B for preventing a short circuit of a magnetic path.

Reference symbols 19A, 19B designate first and second circular arc portions of the outer circumference of the rotor 15 for an angular width A having therein the line of radius 151, corresponding to the first and the second permanent magnets 17A, 17B, respectively. Each circular arc portion is centered on the axis C and has a radius of curvature R. The lines of radius 151 for the permanent magnets 17A, 17B intersect the circular arc portions 19A, 19B at the center 191 thereof, respectively. Each of the first and second circular arc portions 19A, 19B has a first end 192 and a second end 193 located opposite from the first end 192. The angular width between the line of radius 152 that extends to the first end 192 of the first circular arc portion 19A and the line of radius 151 extending to the center 191 of the first circular arc portion 19A is substantially equal to the angular width between the line of radius 153 that extends to the second end 193 of the first circular arc portion 19A and the line of radius 151 extending to the center 191 of the first circular arc portion 19A. The angular width between the line of radius 152 that extends to the first end 192 of the second circular arc portion 19B and the line of radius 151 extending to the center 191 of the second circular arc portion 19B is substantially equal to the angular width between the line of radius 153 that extends to the second end 193 of the second circular arc portion 19B and the line of radius 151 extending to the center 191 of the second circular arc portion 19B. That is, the lines of radius 151 are bisectors that bisect the first circular arc portions 19A and the second circular arc portions 19B in the circumferential direction of the rotor 15, respectively. The term "bisect" here means to divide the angular width of the first circular arc portions 19A and the second circular arc portions 19B into two substantially equal parts.

Figure 3:
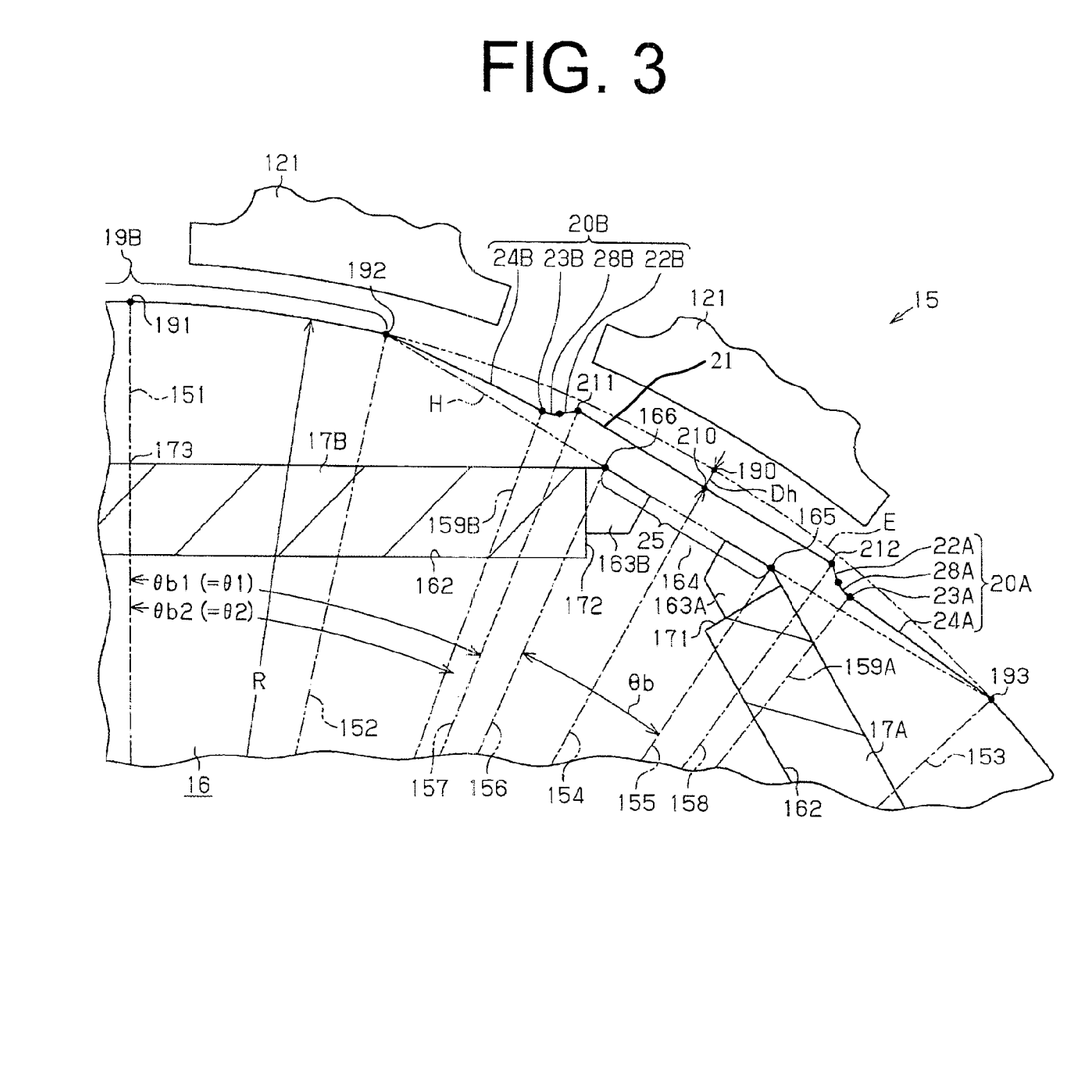
FIG. 3 is a partially enlarged view showing the rotor of the permanent magnet embedded rotating electrical machine or FIG. 1.

The first circular arc portions 19A corresponding to the first permanent magnets 17A are spaced apart from the second circular arc portions 19B corresponding to the second permanent magnets 17B. For example, as shown in FIG. 3, two adjacent circular arc portions 19A and 19B are connected by a first concave portion 20A connected to the first circular arc portion 19A, a second concave portion 20B connected to the second circular arc portion 19B and a convex portion 21 that connects the first concave portion 20A and the second concave portion 20B. The convex portion 21 is located between the pair of concave portions 20A, 20B. The pair of concave portions 20A, 20B is spaced apart from other pair of concave portions 20A, 20B in circumferential direction of the rotor 15. In the present embodiment, as shown in FIG. 2, the first concave portion 20A is formed on the trailing side of the convex portion 21 and the second concave portion 20B is formed on the opposite leading side of the convex portion 21 with respect to the rotational direction Y. As shown in FIG. 2, the convex portion 21 connecting the first and second concave portions 20A and 20B is formed by a straight line which is located in the above imaginary plane extending perpendicularly to the axis C. That is, the convex portion 21 is formed by a flat surface. Reference numerals 211, 212 designate the first and second opposite ends 212 of the convex portion 21, respectively. Straight lines 157, 158 connect between the axis C and the first end 211 and the second end 212 of the convex portion 21, respectively. The opposed magnetic pole ends 171 and 172 of two adjacent permanent magnets 17A and 178 are formed at radially inward of the respective concave portions 20A and 20B.

As shown in FIG. 3, the first concave portion 20A is formed by a first straight line 22A (flat portion) connected to the convex portion 21, a first convex curve 24A (convex curve portion) connected to the first circular arc portion 19A, and a first concave curve 28A (concave curve portion) connected to the first straight line 22A (flat portion) and the first convex curve 24A (convex curve portion), which are all located in the above imaginary plane extending perpendicularly to the axis C. The second concave portion 20B is formed by a second straight line 22B (flat portion) connected to the convex portion 21, a second convex curve 24B (convex curve portion) connected to the second circular arc portion 19B, and a second concave curve 28B (concave curve portion) connected to the second straight line 22B (flat portion) and the second convex curve 24B (convex curve portion), which are all located in the above imaginary plane extending perpendicularly to the axis C.

Referring to FIG. 2, the straight line 159A lying in the imaginary plane extending perpendicularly to the axis C is a line of radius that connects the first deepest portion 23A of the concave portion 20A and the axis C of the rotor 15. The straight line 159B lying in the imaginary plane extending perpendicularly to the axis C is a line of radius that connects the second deepest portion 23B of the concave portion 20B and the axis C of the rotor 15. The straight lines 159A and 159B are the shortest radii of the rotor 15.

Reference numeral 154 designates a line bisecting its corresponding convex portion 21 in the circumferential direction of the rotor 15. The term "bisect" here means to divide the angular width of the convex portions 21. Each bisector 154 is a straight line extending from the axis C to the center 210 of the convex portion 21 and located in the above imaginary plane extending perpendicularly to the axis C. The center 210 of each convex portion 21 corresponds to the magnetic pole switching portion 164 located between the permanent magnets 17A and 17B. As shown in FIG. 3, the gap between the tooth 121 and the outer periphery of the rotor 15 is larger than the interval between the tooth 121 and the imaginary circumference E of the rotor 15. The imaginary circumference E is extended from the first and second circular arc portions 19A and 19B in the circumferential direction of the rotor 15.

Part of the imaginary circumference E between each first end 192 and its corresponding second end 193 is bisected at the center 190. The center 190 lies on the extension of the bisector 154. Distance Dh shown in FIG. 3 represents the distance between the center 210 of the convex portion 21 and the center 190 of the imaginary circumference E. The distance Dh will be referred to as the depth hereinafter.

The convex portions 21 formed at the magnetic pole switching portions 164 have substantially the same shape and size.

The angular width of the first concave portion 20A and the angular width of the second concave portion 20B are both $\theta c$. The first concave portion 20A and the second concave portion 20B have reflectional symmetry (bilateral symmetry) to each other with respect to the bisector 154.

As shown in FIG. 3, the convex portion 21 is formed so as to project radially outwardly to a position that is radially inward of the imaginary circumference E and radially outward of an imaginary straight line H connecting the first end 192 of the second circular arc portion 19B and the second end 193 of the first circular arc portion 19A. That is, the convex portion 21 projects radially outward within a range between the imaginary circumference E and the imaginary straight line H, exclusive of the points on the imaginary circumference E and the imaginary straight line H. The convex portion 21 is radially farther from the axis C than the deepest portions 23A and 23B of the concave portions 20A and 20B. The imaginary straight line H is located in the above imaginary plane extending perpendicularly to the axis C.

Referring to FIG. 2, reference numeral 165 designates the point of intersection between the straight line 155 extending from the axis C to the convex portion 21 and the wall surface of the aforementioned first air gap 163A. Reference numeral 166 designates the point of intersection between the straight line 156 extending from the axis C to the convex portion 21 and the wall surface of the second air gap 163B. These points of intersection will be referred to as the starting points 165 and 166, respectively.

The starting points 165 and 166 will be explained. The starting point 165 corresponding to the first air gap 163A adjacent to the first permanent magnet 17A shown in FIG. 2, and the starting point 166 corresponding to the second air gap 163B adjacent to the second permanent magnet 17B also shown in FIG. 2, will be taken for the explanation. The starting point 165 is a point (designated by P1 in the present specification but not shown in the drawing) at which the convex portion 21 first comes in contact with the wall surface of the first air gap 163A adjacent to the first permanent magnet 17A when the convex portion 21 is moved radially inward. The starting point 166 is a point (designated by P2 in the present specification but not shown in the drawing) at which the convex portion 21 first comes in contact with the wall surface of the second air gap 163B adjacent to the second permanent magnet 17B when the convex portion 21 is moved radially inward.

Depending on the shape of the receiving holes 162 (air gaps 163A and 163B), more than one or infinite number of the points P1 or P2 may appear, for example, when the convex portion 21 moved radially inward linearly overlaps the wall surface of the receiving hole 162 (air gaps 163A and 163B). In this case, more than one or infinite number of points may be available as options for the first point 165, that is, a candidate point X1. Likewise, more than one or infinite number of points may be available as options for the second point 166, that is, a candidate point X2. In these cases, the points X1 and X2 that form the maximum angular width therebetween about the axis C are used as the starting points 165 and 166, respectively.

All the starting points 165 and 166 are thus specified. θb shown in FIG. 2 denotes an angular width made between the straight line 155 which connects the axis C and the starting point 165, and the straight line 156 which connects the axis C and the starting point 166. That is, θb denotes the angular width which the starting points 165 and 166 make with respect to the axis C. The angular width θb will be referred to as inter-bridge angle θb, hereinafter. The bridge 25 in the context of the inter-bridge angle θb refers to a range between any two adjacent permanent magnets 17A, 17B and radially outward of the two air gaps 163A, 163B located on the opposite sides of the magnetic pole switching portion 164.

The angular position of the bridge 25 (made between the straight lines 155 and 156) about the axis C of the rotor 15 ranges within the angular position of the convex portion 21 (made between the straight lines 157 and 158) about the axis C. For example, as shown in FIG. 3, the first concave portion 20A corresponding to the first magnetic pole end 171 is located close to the magnetic pole center 173 of the first permanent magnet 17A in relation to the bridge 25 as viewed in the circumferential direction of the rotor 15. The second concave portion 20B corresponding to the second magnetic pole end 172 is located close to the magnetic pole center 173 of the second permanent magnet 17B in relation to the bridge 25 as viewed in the circumferential direction of the rotor 15.

That is, the concave portion (20A or 20B) corresponding to one of the two adjacent magnetic pole ends 171 and 172 is located close to the magnetic pole center 173 of the permanent magnet (17A or 17B) having the one magnetic pole end (171 or 172) in relation to the bridge 25 corresponding to the pair of air gaps 163A and 163B as viewed in the circumferential direction of the rotor 15. The pair of air gaps 163A and 163B serves to prevent the magnetic flux short-circuit.

Referring to FIGS. 2 and 3, the reference symbols θ1, θ2, θa1, θb1, θa2, θb2 denote electrical degree. In the present embodiment wherein the number of poles is 6 and the number of slots is 18, the electrical degree is three times as large as the rotation angle of the rotor 15. The electrical degree θb1 of the first end 211 of the convex portion 21 is in the range of 70° to 80° as measured from the line of radius 151 (bisecting the second circular arc portion 19B in FIGS. 2 and 3) that is closest to the first end 211 in the direction opposite to the rotational direction Y. The electrical degree θa1 of the second end 212 of the convex portion 21 is in the range of 70° to 80° as measured from the line of radius 151 (bisecting the first circular arc portion 19A in FIGS. 2 and 3) that is closest to the second end 212 in the rotational direction Y.

In the present embodiment, θa1=θb1 (=θ1). That is, in the present embodiment wherein the number of poles is 6 and the number of slots is 18, the electrical degree θ1 is in the range of 70° to 80° as measured from the lines of radius 151 which pass through the magnetic pole centers 173 of the first and second permanent magnets 17A and 17B and are closest to the first and second ends 211 and 212.

The electrical degree θa2 of the first deepest portion 23A of the first concave portion 20A is in the range of (θ1−10°) to θ1 as measured from the line of radius 151 (which bisects the first circular arc portion 19A in FIGS. 2 and 3) that is closest to the first deepest portion 23A in the rotational direction Y. The electrical degree θb2 of the second deepest portion 23B of the second concave portion 20B is in the range of (θ1−10°) to θ1 as measured from the line of radius 151 (which bisects the second circular arc portion 19B in FIGS. 2 and 3) that is closest to the second deepest portion 23B in the direction opposite to the rotational direction Y.

In the present embodiment, θa2=θb2 (=θ2). That is, in the present embodiment wherein the number of poles is 6 and the number of slots is 18, the electrical degree θ2 of the deepest portions 23A and 23B of the concave portions 20A and 20B is in the range of (θ1−10°) to θ1 as measured from the lines of radius 151 which pass through the magnetic pole centers 173 of the first and second permanent magnets 17A and 17B and are closest to the first and second ends 211 and 212.

Figures 7A, 7B, 7C, 7D:
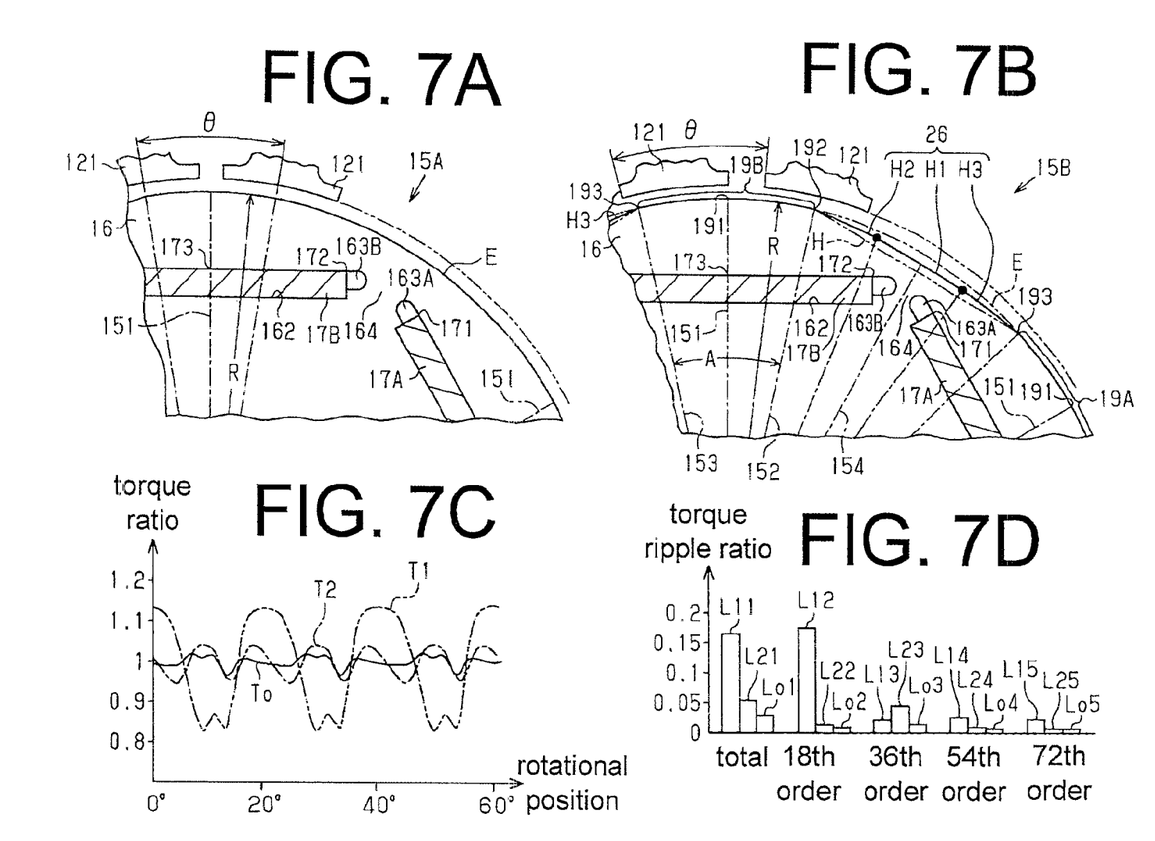
FIG. 7A is a partial cross-sectional view showing a first comparative rotor of a permanent magnet embedded rotating electrical machine according to a related art.
FIG. 7B is a partial cross-sectional view showing a second comparative rotor of a permanent magnet embedded rotating electrical machine according to a related art.
FIG. 7C is a graph showing the torque fluctuation in the first comparative rotor, the second comparative rotor and the rotor of the embodiment.
FIG. 7D is a bar graph showing comparison between order components of torque ripple ratios corresponding to specified orders obtained by the Fourier series expansion.

FIG. 7A shows a first comparative rotor 15A whose outer periphery in cross section is formed by an imaginary circumference E having a radius of curvature R. FIG. 7B shows a second comparative rotor 15B having a convex portion 26 formed by connecting three straight lines H1, H2 and H3.

The curve T1 of FIG. 7C shows a torque ratio (expressed as instantaneous torque divided by average torque) of the total torque of the rotating electrical machine using the first comparative rotor 15A of FIG. 7A. The curve T2 of FIG. 7C shows a torque ratio (expressed as instantaneous torque divided by average torque) of the total torque of the rotating electrical machine using the second comparative rotor 15B of FIG. 7B. The curve To of FIG. 7C shows a torque ratio (expressed as instantaneous torque divided by average torque) of the total torque of the rotating electrical machine of the rotor 15 of the present embodiment. Torque fluctuation (torque ripple) is the smallest in the rotating electrical machine using the rotor 15 of the present embodiment.

The bar graph of FIG. 7D shows comparison among the rotating electrical machines using the first comparative rotor 15A of FIG. 7A, the second comparative rotor 15B of FIG. 7B and the rotor 15 of the present embodiment in terms of the torque ripple ratio of the total torque and the order components of torque ripple ratios. The order components of torque ripple ratios correspond to specific orders obtained by the Fourier series expansion of the waveform of the torque ratio of the total torque. The length of the bars L11, L12, L13, L14 and L15 represents the torque ripple ratio of the rotating electrical machine using the first comparative rotor 15A. The length of the bars L21, L22, L23, L24 and L25 represents the torque ripple ratio of the rotating electrical machine using the second comparative rotor 15B.

The length of the bars Lo1, Lo2, Lo3, Lo4 and Lo5 represents the torque ripple ratio of the rotating electrical machine using the rotor 15 of the present embodiment. The length of the bars L11, L21, Lo1 represents the torque ripple ratio of the total torque. The length of the bars L12, L22, Lo2 represents the order component ratio of torque ripple ratio in the case of the fundamental order (eighteenth order). The length of the bars L13, L23, Lo3 represents the order component ratio of torque ripple ratio in the case of the order (thirty-sixth order) twice the fundamental order. The length of the bars L14, L24, Lo4 represents the order component ratio of torque ripple ratio in the case of the order (fifty-fourth order) three times as large as the fundamental order. The length of the bars L15, L25, Lo5 represents the order component ratio of torque ripple ratio in the case of the order (seventy-second order) fourth times as large as the fundamental order.

FIGS. 7C and 7D are results from the FEM (finite element method) analysis using a computer. Although the torque fluctuation (torque ripple) of the total torque in the rotating electrical machine using the second comparative rotor 15B is considerably reduced as compared to the torque ripple of an output torque (hereinafter referred to as total torque) in the rotating electrical machine using the first comparative rotor 15A, the torque ripple of the total torque in the rotating electrical machine using the rotor 15 is further reduced as compared to the torque ripple of the total torque in case of the second comparative rotor 15B. The torque ripple for a specific order of the torque in the rotating electrical machine using the rotor 15 is reduced or the same as compared to the torque ripple for the specific order of the torque in case of the second comparative rotor 15B.

Figure 8A:
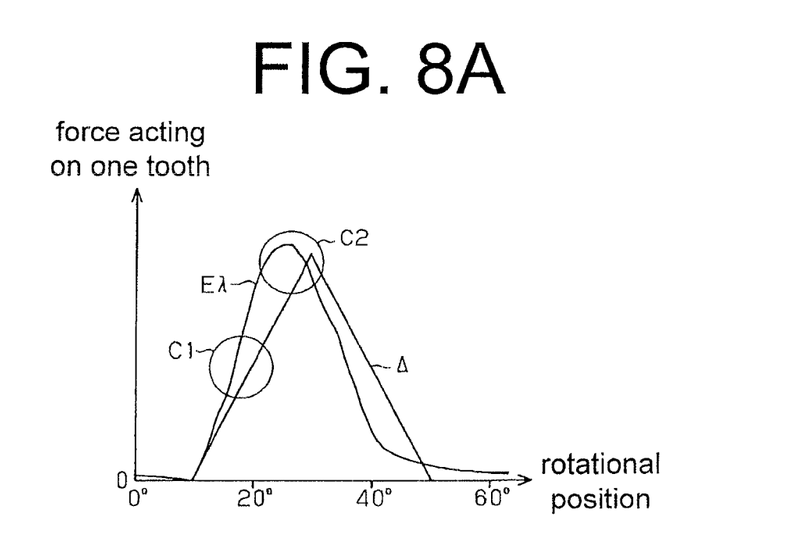
FIG. 8A is a graph showing the relationship between the rotational position of the rotor and the force acting on one tooth.
Figure 8B:
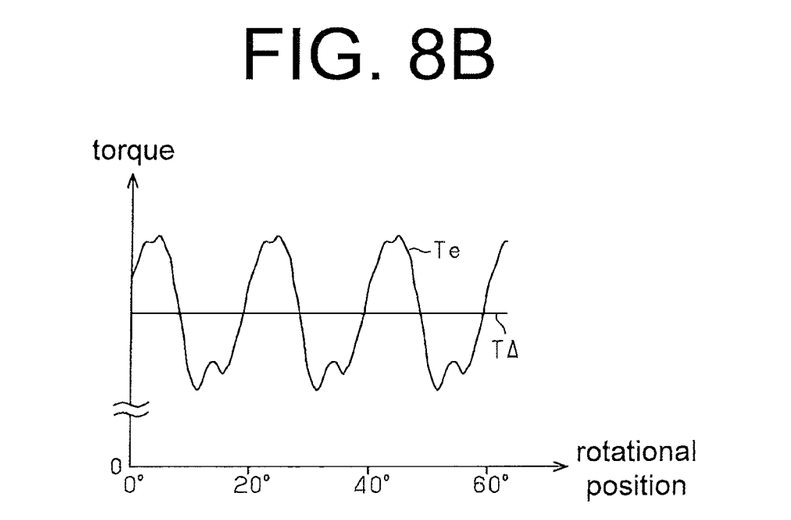
FIG. 8B is a graph showing the relationship between the rotational position of the rotor and the total torque.

The graph of FIG. 8A shows the relationship between the rotational position of the rotor 15 and the force acting on one tooth 121, which will be hereinafter referred to as tooth torque. Specifically, the graph shows an ideal waveform Δ and the actual waveform Eλ. The ideal waveform Δ and the horizontal axis form an isosceles triangle having an angle of 40° between the starting end and the terminating end on the horizontal axis forming the bottom of the isosceles triangle. A straight line TΔ shown in the graph of FIG. 8B is obtained by synthesizing such ideal waveforms Δ for all the teeth 121. That is, if the tooth torque represented by the ideal waveform Δ acts on every tooth 121 of the rotor 15, the total torque of the rotor 15 will be constant. As a result, the torque ripple becomes zero.

The actual waveform Eλ in the graph of FIG. 8A shows the relationship between the rotational position of a round rotor (not shown) having the circumferential surface with the radius of curvature R along the entire outer circumference thereof and the tooth torque acting on one tooth 121. Waveform Te shown in the graph of FIG. 8B is obtained by synthesizing the actual waveforms Eλ for all the teeth 121. That is, if the tooth torque acting on each tooth 121 is the force as shown by the actual waveform Eλ, the total torque having the torque ripple which is not zero is generated. The torque ripple can be reduced as the shape of the actual waveform Eλ becomes closer to the shape of the ideal waveform Δ.

The actual waveform Eλ is considerably deviated from the ideal waveform Δ upward in the graph of FIG. 8A in the region indicated by the first and second circles C1 and C2. The torque ripple becomes larger as the deviation in the regions encircled by C1 and C2 becomes larger.

The present inventors found by FEM analysis that, when the rotor 15 is rotated in the rotational direction Y as shown in FIG. 2, the tooth torque generated in the regions encircled by the C1 and C2 is concentrated at the first concave portion 20A of the rotor core 16. Based on the result of the FEM analysis, the first concave portion 20A is provided in the region where the tooth torque is concentrated. The first concave portion 20A increases the magnetic resistance in the vicinity of the first concave portion 20A. As a result, the actual waveform Eλ in the vicinity of the regions C1 and C2 shown in FIG. 8A becomes closer to the ideal waveform Δ.

Figure 9:
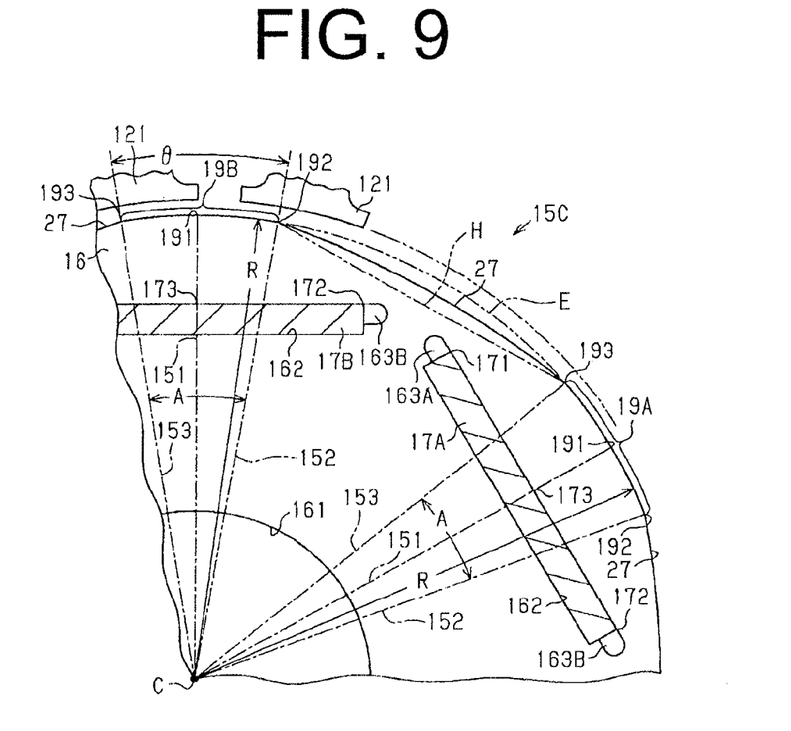
FIG. 9 is a partial cross-sectional view showing a third comparative rotor of a permanent magnet embedded rotating electrical machine according to a related art.
Figure 10:
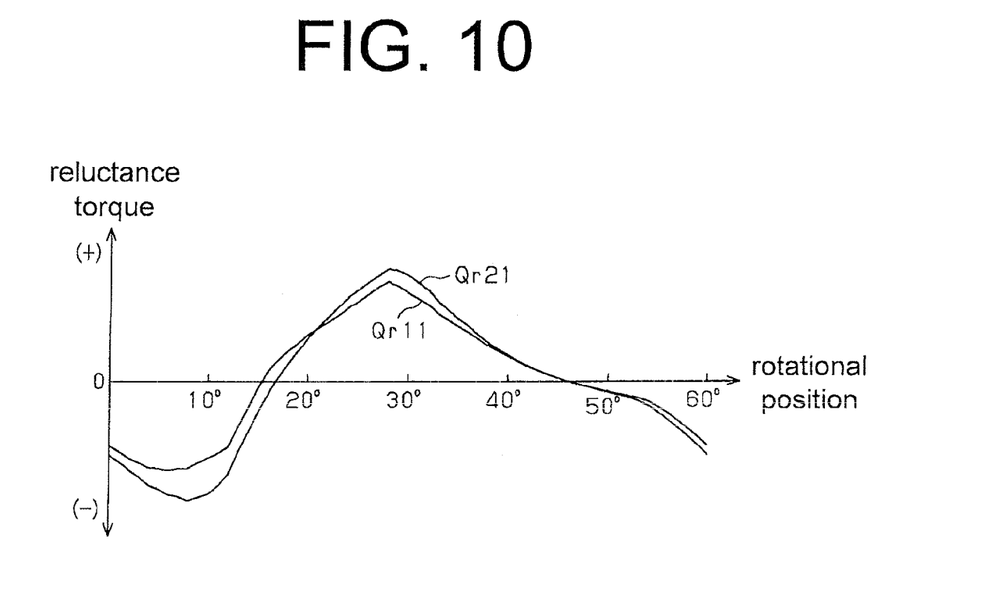
FIG. 10 is a graph showing the fluctuation of reluctance torque of a single tooth in the second comparative rotor of FIG. 7B and the third comparative rotor of FIG. 9.

The graph of FIG. 10 shows the variation of reluctance torque of a single tooth 121. The curve Qr11 shows the variation of reluctance torque in case of the second comparative rotor 15B of FIG. 7B and the curve Qr21 shows the variation of reluctance torque in case of a third comparative rotor 15C shown in FIG. 9.

As shown in FIG. 9, the third comparative rotor 15C has on the outer peripheral surface thereof arcuate convex portions 27. Each arcuate convex portion 27 has a circumferential surface curved radially outward of the third comparative rotor 15C. Each arcuate convex portion 27 is located so as to connect between a first circular arc portion 19A and its adjacent second circular arc portion 19B.

Specifically, the arcuate convex portion 27 connects the first end 193 of the first circular arc portion 19A to the second end 192 of the second circular arc portion 19B. The arcuate convex portion 27 has a radius of curvature that is greater than the radius of curvature R of the circular arc portions 19A, 19B. The arcuate convex portions 27 on the outer periphery of the rotor core 16 all have the same shape and size. Each arcuate convex portion 27 is located inward of an imaginary circumference E which includes the circular arc portions 19A and 19B, and outward of an imaginary line H which connects the second end 192 of the second circular arc portion 19B and the first end 193 of the first circular arc portion 19A.

The curve Qr11 and the curve Qr21 in the graph of FIG. 10 are examples of the FEM analysis performed using a computer. The FEM analysis is performed under the following conditions the angular width A=28°, the angular width θc=13°, the inter-bridge angle θb=5.2°, the depth Dh=0.3 mm, and the radius R=25.5 mm.

Figures 11A, 11B:
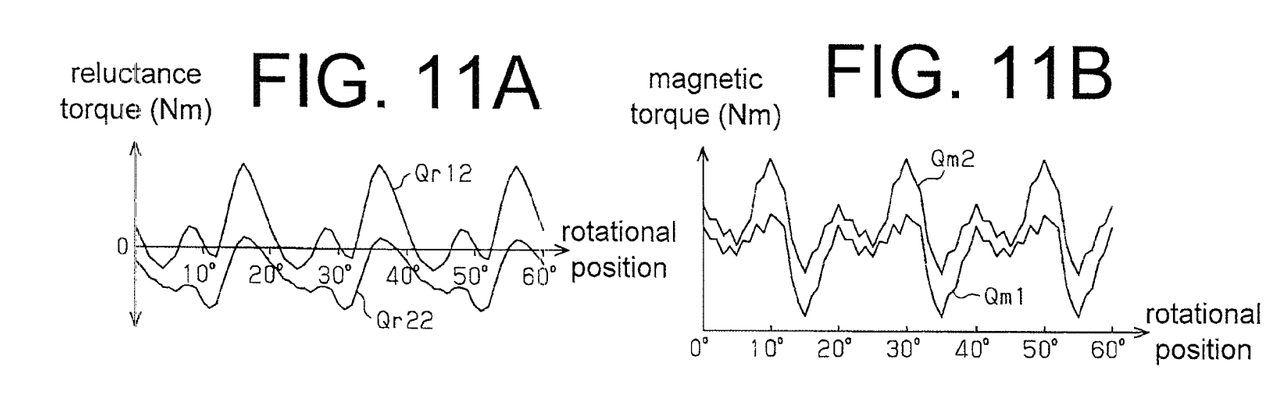
FIG. 11A is a graph showing the fluctuation of synthesized reluctance torque in the second comparative rotor of FIG. 7B and the third comparative rotor of FIG. 9.
FIG. 11B is a graph showing the fluctuation of magnetic torque in the second comparative rotor of FIG. 7B and the third comparative rotor of FIG. 9.

The curve Qr12 in the graph of FIG. 11A represents the fluctuation of the synthesized reluctance torque obtained by synthesizing the curves Qr11 of the respective eighteen teeth 121 shown in FIG. 10. The curve Qr22 represents the fluctuation of the synthesized reluctance torque obtained by synthesizing the curves Qr21 of the respective eighteen teeth 121 shown in FIG. 10.

The curve Qm1 in the graph of FIG. 11B represents the fluctuation of the torque in case of using the second comparative rotor 15B. The torque of the permanent magnets 17A, 17B will be hereinafter referred to as magnetic torque. The curve Qm2 represents the fluctuation of the magnetic torque in case of using the third comparative rotor 15C.

Figure 11C:
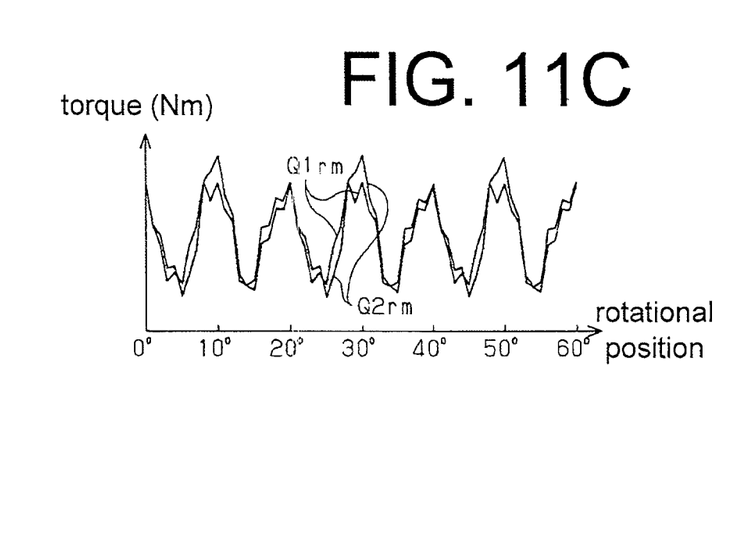
FIG. 11C is a graph showing the synthesized torque waveform in the second comparative rotor of FIG. 7B and the third comparative rotor of FIG. 9.

The curve Q1rm of the graph of FIG. 11C represents a torque waveform obtained by synthesizing the curve Qr12 of FIG. 11A and the curve Qm1 of FIG. 11B. The curve Q2rm in the graph of FIG. 11C is a torque waveform obtained by synthesizing the curve Qr22 of FIG. 11A and the curve Qm2 of FIG. 11B. That is, the curve Q1rm is a torque waveform obtained by the FEM analysis in using the second comparative rotor 15B of FIG. 7B, and the curve Q2rm is a torque waveform obtained by the FEM analysis in using the third comparative rotor 15C of FIG. 9.

Comparing the curve Q1rm with the curve Q2rm, the torque ripple represented by the curve Q1rm is apparently smaller than the torque ripple represented by the curve Q2rm. The torque ripple developed in case of using the rotor 15 of the present embodiment becomes further smaller than the torque ripple of the curve Q1rm.

When the rotor 15 of the present embodiment is used, the extent of contribution of the reluctance torque to the total torque is small. The present embodiment dispenses with any auxiliary magnetic pole disclosed by Japanese Patent Application Publication No. 2005-261024.

The above-described embodiment of the present invention offers the following advantageous effects.

(1) In the arrangement of the rotor 15 of the permanent magnet embedded rotating electrical machine wherein the first concave portion 20A located on one side of the convex portion 21 is located close to the magnetic pole center 173 of the first permanent magnet 17A in relation to the bridge 25 in the circumferential direction of the rotor 15 and the second concave portion 20B located on the other side of the convex portion 21 is located close to the magnetic pole center 173 of the second permanent magnet 17B in relation to the bridge 25 in the circumferential direction of the rotor 15, the torque ripple of the permanent magnet embedded rotating electrical machine M whose flat permanent magnets 17A and 17B are arranged in rotational symmetry is suppressed.

(2) The electrical degree θ1 of the ends 211 and 212 of the convex portion 21 is in the range of 70° to 80°. In addition, the electrical degree θ2 of the deepest portions 23A and 23B of the concave portions 20A and 20B is in the range of (θ1−10°) to θ1. Such structure is particularly effective in suppressing the toque ripple of the permanent magnet embedded rotating electrical machine M.

(3) The first concave curve 28A formed between the first straight line 22A and the first convex curve 24A, and the second concave curve 28B formed between the second straight line 22B and the second convex curve 24B contribute to alleviating the concentration of stress on the deepest portions 23A and 23B of the concave portions 20A and 20B.

(4) The concave portions 20A and 20B are arranged in reflectional symmetry with each other with respect to the bisector 154 that bisects the convex portion 21. Such arrangement offers the same effect in suppressing the toque ripple regardless of the rotational direction of the rotor 15.

(5) The stator 11 having three-phase coils 13 formed in the manner of wave winding is effective in suppressing the vibration of the permanent magnet embedded rotating electrical machine M.

The present invention has been described in the context of the above-described embodiment, but it is not limited to the illustrated embodiment. It is obvious that the present invention may be practiced in various manners as exemplified below.

In a modification of the embodiment, the concave portions 20A and 20B may dispense with the straight lines 22A and 22B, respectively. In this case, the concave portions 20A and 20B may be formed by the convex curves 24A and 24B and the concave curves 28A and 28B, respectively. Alternatively, any concave curve or convex curve may be used instead of the straight lines 22A and 22B.

Any straight line or concave curve may be used instead of the convex curves 24A and 24B of the concave portions 20A and 20B. Alternatively, any complex shape of the straight line and the concave curve may be used.

The ends 211 and 212 of the convex portion 21 may have any deepest portions of the concave portions 20A and 20R, respectively.

The concave portions 20A and 20B may have reflectional asymmetry with each other with respect to the bisector 154 that bisects the convex portion 21.

The first convex curve 24A and the first circular arc portion 19A may be connected via any convex curve, concave curve or straight line instead of being connected directly.

Non-magnetic materials may be disposed in the air gaps 163A and 163B for preventing the magnetic flux short-circuit.

The present invention is applicable to a permanent magnet embedded rotating electrical machine (having four poles and twelve slots, eight poles and twenty four slots, or the like) other than a permanent magnet embedded rotating electrical machine having six poles and eighteen slots.

What is claimed is:

1. A permanent magnet embedded rotating electrical machine, comprising:
    an annular stator having on an inner circumference thereof teeth to define a plurality of slots between the teeth, the slots having therein coils;
    a rotor located inside the stator, the rotor being rotatable on an axis, the rotor having on an outer periphery thereof a plurality of circular arc portions, a plurality of pairs of concave portions and a plurality of convex portions, wherein centers of the circular arc portions are located at the axis of the rotor, wherein each pair of the concave portions is connected to ends of the adjacent circular arc portions, wherein each of the convex portions is located between the pair of the concave portions, outer surfaces of the convex portions being formed at radially outward of deepest portions of the concave portions, the pair of the concave portions being spaced apart from other pairs of the concave portions in a circumferential direction of the rotor; and
    a plurality of flat permanent magnets having magnetic pole ends and embedded in the rotor in rotational symmetry in a manner that each permanent magnet is spaced apart from other ones of the permanent magnets, opposed magnetic pole ends of two adjacent ones of the permanent magnets being formed at radially inward of a corresponding one of the concave portions, each permanent magnet having a magnetic pole center between the magnetic pole ends,
    wherein a bridge is provided in the rotor at an angular position about the axis between the opposed magnetic pole ends of the two adjacent ones of the permanent magnets, wherein each circular arc portion is formed at a radially outward periphery position from the magnetic pole center of each of permanent magnet, wherein each convex portion is located between the adjacent permanent magnets, wherein each concave portion at radially outward of the magnetic pole end of the permanent magnet is located close to the magnetic pole center of the same permanent magnets in relation to the bridge next to the permanent magnet in the circumferential direction of the rotor, wherein each outer surface of the convex portions and the concave portions is located radially inward of an imaginary circumference, which is extended from the circular arc portion in the circumferential direction of the rotor, wherein each outer surface of the convex portions and the concave portions is located radially outward of an imaginary straight line that connects the ends of the adjacent circular arc portions.

2. The permanent magnet embedded rotating electrical machine according to claim 1, wherein the angular position of each bridge about the axis of the rotor ranges within angular position of the width of the convex portion about the axis of the rotor.

3. The permanent magnet embedded rotating electrical machine according to claim 1, wherein each concave portion is formed by a combination of a flat portion connected to the convex portion, a convex curve portion connected to the circular arc portion, and a concave curve portion connected to the flat portion and the convex curve portion, wherein the deepest portion of each concave portion is located between the convex curve portion and the concave curve portion.

4. The permanent magnet embedded rotating electrical machine according to claim 1, wherein each outer surface of the convex portion is formed by a flat surface.

5. The permanent magnet embedded rotating electrical machine according to claim 1, wherein an electrical degree $\theta 1$ of an end of each convex portion about the axis of the rotor is in the range of 70° to 80° as measured from a line of radius which passes through the magnetic pole center of the permanent magnet and is closest to the end of the convex portion, wherein an electrical degree $\theta 2$ of the deepest portion of each concave portion about the axis of the rotor is in the range of ($\theta 1-10°$) to $\theta 1$ as measured from the line of radius.

6. The permanent magnet embedded rotating electrical machine according to claim 1, wherein the paired concave portions are arranged in reflectional symmetry with each other with respect to bisectors that bisect the corresponding convex portions.

* * * * *